United States Patent
Kojima et al.

(10) Patent No.: US 8,985,069 B2
(45) Date of Patent: Mar. 24, 2015

(54) PORTABLE ENGINE GENERATOR

(71) Applicant: Honda Motor Co., Ltd., Tokyo (JP)

(72) Inventors: Hiroaki Kojima, Wako (JP); Masashi Kai, Wako (JP); Takuo Kase, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/889,861

(22) Filed: May 8, 2013

(65) Prior Publication Data

US 2014/0026828 A1    Jan. 30, 2014

(30) Foreign Application Priority Data

Jul. 30, 2012    (JP) ................. 2012-168349

(51) Int. Cl.
| | |
|---|---|
| F02B 63/04 | (2006.01) |
| F02D 19/02 | (2006.01) |
| F01M 11/06 | (2006.01) |
| F02M 21/02 | (2006.01) |

(52) U.S. Cl.
CPC .............. *F02B 63/04* (2013.01); *F01M 11/065* (2013.01); *F02B 2063/046* (2013.01); *F02M 21/0212* (2013.01); *F02D 19/023* (2013.01); Y02T 10/32 (2013.01)
USPC .......................... 123/41.86; 123/572; 290/1 A

(58) Field of Classification Search
USPC ............. 123/2, 41.86, 572, 573, 574, DIG. 5; 290/1 A, 1 B
See application file for complete search history.

(56) References Cited

U.S. PATENT DOCUMENTS

| | | | | |
|---|---|---|---|---|
| 4,667,647 A * | 5/1987 | Ohtaka et al. | ................... | 123/573 |
| 6,374,782 B2 * | 4/2002 | Ishikawa et al. | ........... | 123/73 AF |
| 6,378,468 B1 * | 4/2002 | Kouchi et al. | ............... | 123/41.56 |
| 6,378,469 B1 * | 4/2002 | Hiranuma et al. | .......... | 123/41.56 |
| 6,644,290 B2 * | 11/2003 | Yoneyama et al. | ............ | 123/572 |
| 6,886,543 B2 * | 5/2005 | Yamada | .......... | 123/511 |
| 6,973,922 B2 * | 12/2005 | Yamada et al. | ................ | 123/495 |
| 7,210,441 B1 * | 5/2007 | Burns | ....................... | 123/179.11 |
| 7,705,478 B2 * | 4/2010 | Hirose et al. | ................... | 290/1 A |
| 7,743,739 B2 * | 6/2010 | Kochi et al. | ......................... | 123/2 |
| 8,047,187 B2 * | 11/2011 | Ono et al. | ....................... | 123/573 |
| 8,123,829 B2 * | 2/2012 | Sato et al. | ..................... | 55/385.3 |
| 8,413,639 B2 * | 4/2013 | Kobayashi et al. | ............ | 123/511 |
| 8,528,517 B2 * | 9/2013 | Fukano | ...................... | 123/198 D |
| 8,539,937 B2 * | 9/2013 | Kobayashi | ..................... | 123/572 |
| 2011/0088641 A1 | 4/2011 | Shudo et al. | | |

FOREIGN PATENT DOCUMENTS

JP    2011-085118    4/2011

* cited by examiner

*Primary Examiner* — Lindsay Low
*Assistant Examiner* — Grant Moubry
(74) *Attorney, Agent, or Firm* — Rankin, Hill & Clark LLP

(57) ABSTRACT

A portable engine generator includes a power generation unit operating an engine to generate electricity and a negative pressure fuel cock using a negative pressure in a crank chamber as an operating negative pressure to supply fuel to the engine. The negative pressure fuel cock is located on a side opposite to a negative pressure take-out port of the crank chamber with respect to a position of the power generation unit when the portable gas-engine generator is turned over, and so as to be located at a position higher than the negative pressure take-out port when the portable gas-engine generator is in an upright posture.

2 Claims, 4 Drawing Sheets

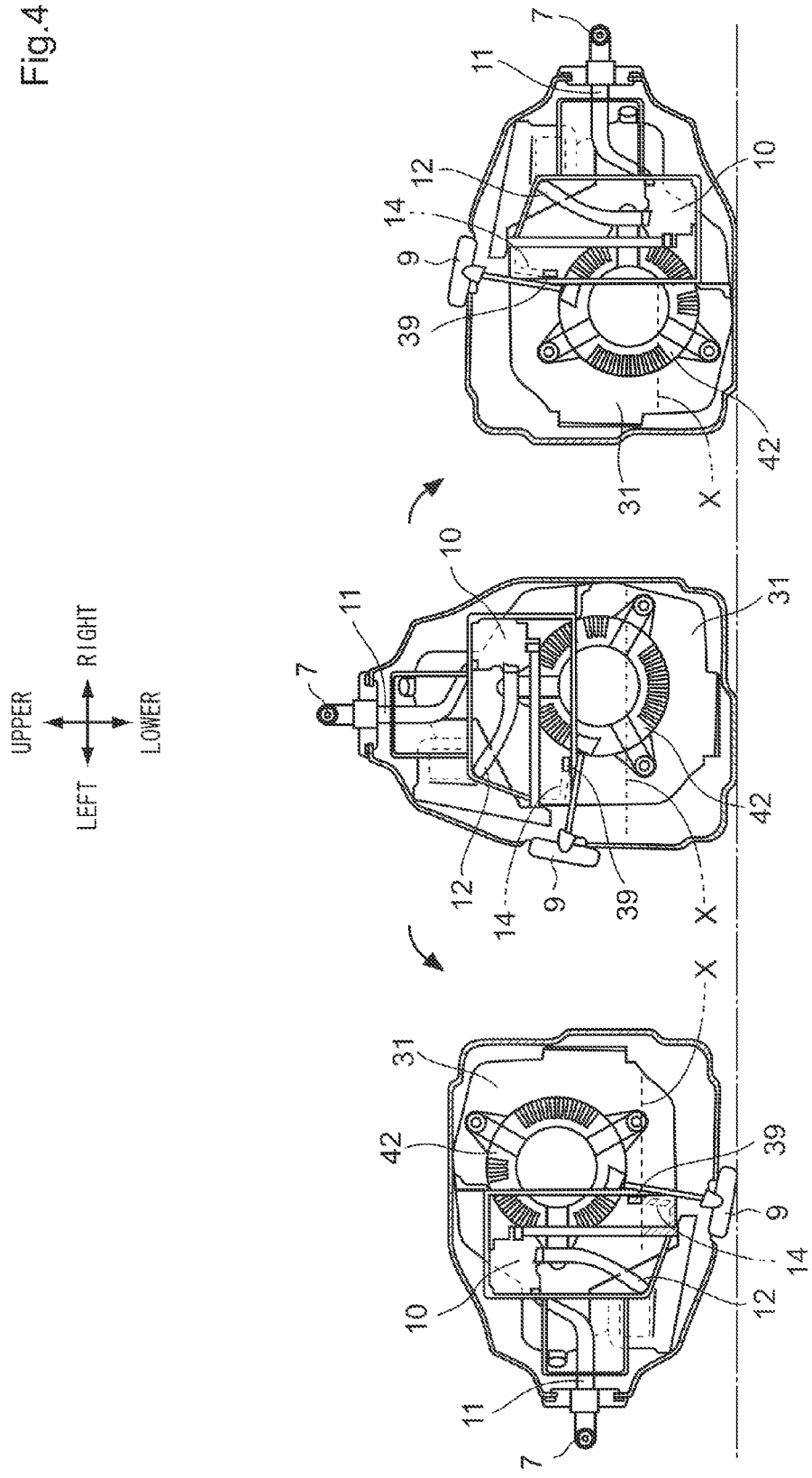

PORTABLE ENGINE GENERATOR

TECHNICAL FIELD

The present invention relates to a portable engine generator and, more particularly, to a layout structure of a fuel system in a portable gas-engine structure operated with combustion gas supplied from a gas cylinder such as an LPG gas cylinder.

BACKGROUND ART

A gas-engine generator includes an engine operated with gas as fuel, a generator generating electricity from an engine output, a fuel system supplying gas fuel to the engine, and an exhaust system exhausting exhaust gas from the engine.

Conventionally, a fuel system in a portable gas-engine generator includes a manual fuel cock provided for supplying depressurized gas fuel from a gas cylinder, etc., an on-off valve provided for supplying the gas fuel to an engine side, a vaporizer heating the gas fuel to gasify it, a mixer mixing supply gas and air, and a zero governor that controls a pressure of fuel to be supplied to the mixer to a constant value. A negative cock is provided integrally with the on-off valve, allowing the on-off valve to open by a negative pressure in a crank case of the engine, whereby the gas is supplied to the engine side only when the engine is in operation.

The portable gas-engine generator is easily turned over because of its small size and light weight and, when the negative pressure in the crank case is used as a negative pressure for operating the negative pressure cock, lubricant in the crank case may enter into the negative cock at the time of turnover (disadvantageous flowing of lubricant may occur) to cause malfunction.

To avoid this, as described in, e.g., JP 2011-85118 A, there is proposed a structure in which a breather chamber is provided separately from the crank case for the purpose of taking out the negative pressure, so as to prevent the lubricant from entering the negative pressure cock at the time of turnover.

CITATION LIST

Patent Literature

Patent Literature 1: Japanese unexamined Patent Application No. 2011-085118

SUMMARY OF INVENTION

Technical Problem

However, in a portable gas-engine generator having a small size and a light weight, it is difficult to provide the separate breather chamber inside a gas-engine generator body in terms of space.

Further, the negative cock makes great use of rubber parts and therefore has a limitation in terms of use temperature. Thus, in a case where the negative pressure cock is installed inside the generator body, the negative cock is affected by heat from an engine or an electronic device in some locations, which may result in exceeding the limit of the use temperature. Thus, there is a need to make further consideration of the installation location of the negative cock.

The present invention has been made in view of the above situation, and an object thereof is to provide a layout structure of a fuel system suitable for a small-sized, light-weighted portable engine generator.

Solution to Problem

The first feature of the present invention to accomplish aforementioned object is a portable engine generator comprising: a power generation unit (40) operating an engine (30) to generate electricity; and a negative pressure fuel cock (10) using a negative pressure in a crank chamber (31) as an operating negative pressure to supply fuel to the engine (30), wherein the negative pressure fuel cock (10) is disposed between cooling air take-in ports (43) of the engine (30) and cooling air take-in louvers (8) formed in an outer cover (2) of the portable engine generator, so as to be located on a side opposite to a negative pressure take-out port (39) of the crank chamber (31) with respect to a position of the power generation unit (40) when the portable engine generator is turned over, and so as to be located at a position higher than the negative pressure take-out port (39) when the portable engine generator is in an upright posture.

The second feature of the present invention is that the cooling air take-in ports (43) of the engine (30) are formed in a fan cover (42) covering a recoil pulley (44) for starting the engine (30).

The third feature of the present invention is that the engine (30) is a gas engine operated using gas as fuel.

Advantageous Effects of Invention

According to the present invention, the negative pressure fuel cock (10) is disposed so as to be located on a side opposite to a negative pressure take-out port (39) of the crank chamber (31) with respect to a position of the power generation unit (40) when the portable engine generator is turned over. Thus, when the portable engine generator is turned over, the negative pressure fuel cock (10) is located at a position higher than the negative pressure take-out port (39), so that even if lubricant in the crank chamber leaks from the negative pressure take-out port (39), the lubricant does not flow into the negative pressure fuel cock (10).

Further, the negative pressure fuel cock (10) is disposed so as to be located at a position higher than the negative pressure take-out port (39) when the portable engine generator is in an upright posture, so that when the portable engine generator is returned to the upright state from the turned-over state, the lubricant that has leaked does not flow to the negative pressure fuel cock (10) but can be brought back to the crank chamber (31).

Further, the negative pressure fuel cock (10) is disposed between the cooling air take-in ports (43) and cooling air take-in louvers (8), so that cooling air can be guided to the negative pressure fuel cock (10) effectively, thereby preventing temperature rise of the negative pressure fuel cock (10).

BRIEF DESCRIPTION OF DRAWING

FIG. 4 is explanatory view illustrating the level of lubricant when the portable engine generator is turned over. The left figure is explanatory view illustrating the portable engine generator is turned over to the left, the center figure is explanatory view illustrating the portable engine generator is in the upright posture and the right figure is explanatory view illustrating the portable engine generator is turned over to the right.

DESCRIPTION OF EMBODIMENTS

The present invention will be described in detail below with reference to the drawings.

Figure 1:
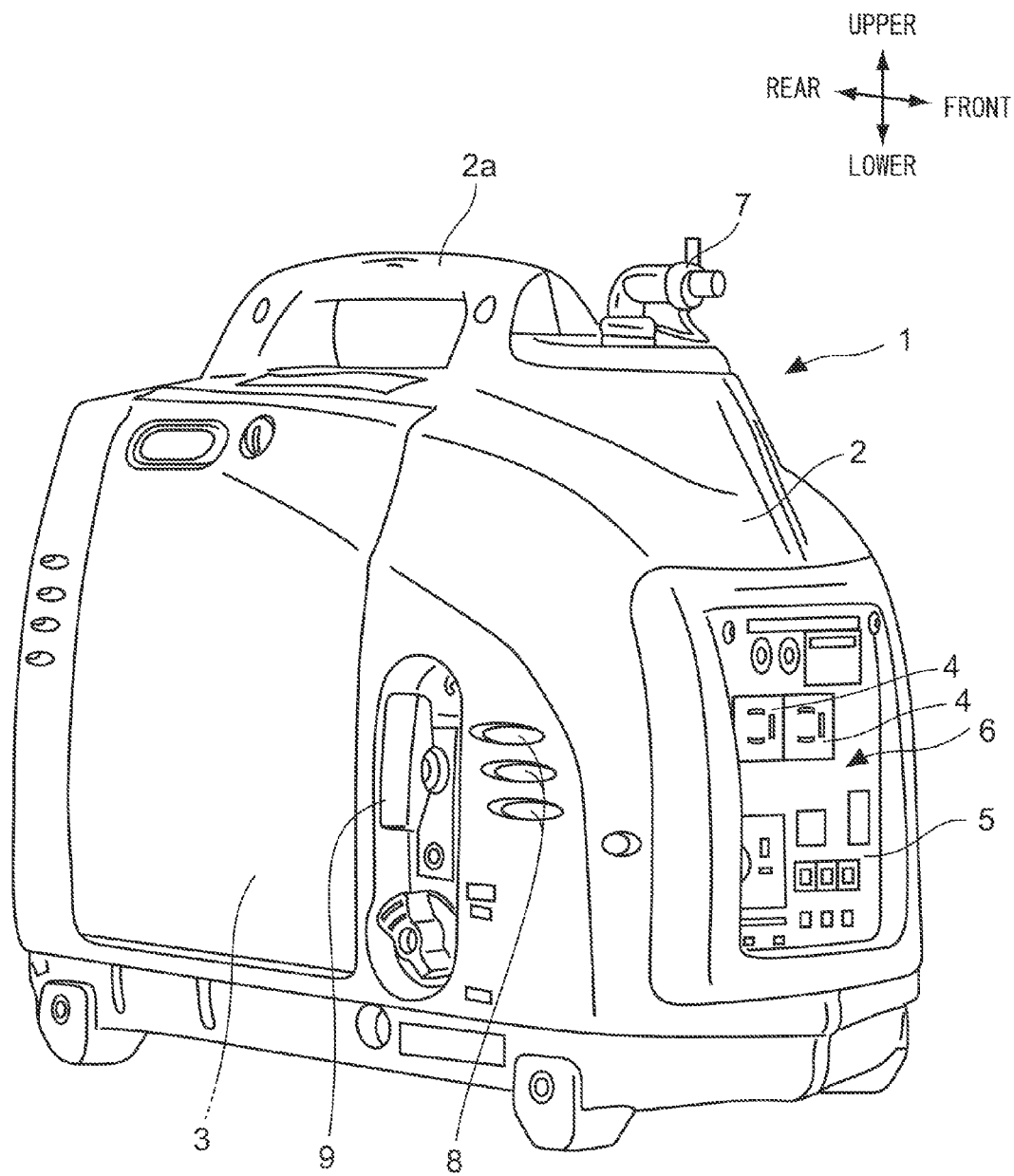
FIG. 1 is a perspective explanatory view of a portable engine generator according to an embodiment of the present invention.

FIG. 1 is a perspective explanatory view illustrating an outer appearance of a portable gas-engine generator according to an embodiment of the present invention.

A portable gas-engine generator 1 houses a gas-engine generator body 3 in an outer cover 2. An operation panel 6 is attached to a front side of the outer cover 2. The operation panel 6 includes two output terminals 4 for AC power source and an operation unit 5 for operating the gas-engine generator body 3.

A handle portion 2a is formed integrally with the outer cover 2 at an upper side thereof, and a gas take-in port 7 capable of taking gas from a gas cylinder, etc. is provided at the front side of the handle portion 2a.

A plurality of cooling air take-in louvers 8 for taking in air inside the outer cover 2 are formed on both side surfaces of the outer cover 2. Further, a pull-out grip 9 connected to a recoil starter for starting the gas-engine generator body 3 is provided on one side surface of the outer cover 2.

Figure 2:
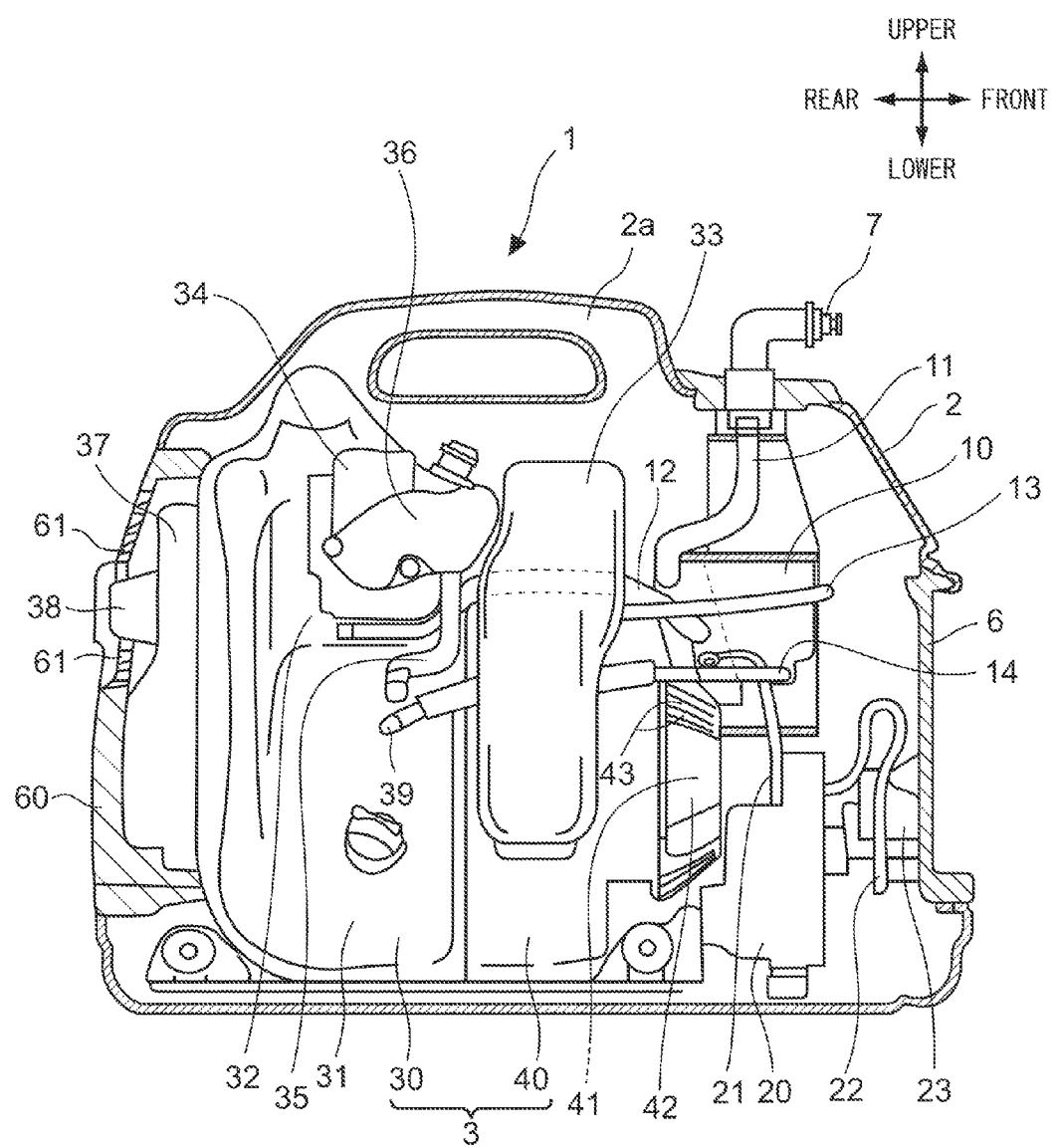
FIG. 2 is an explanatory side view illustrating of the arrangement structure of each part article which constitutes the portable engine generator.
Figure 3:
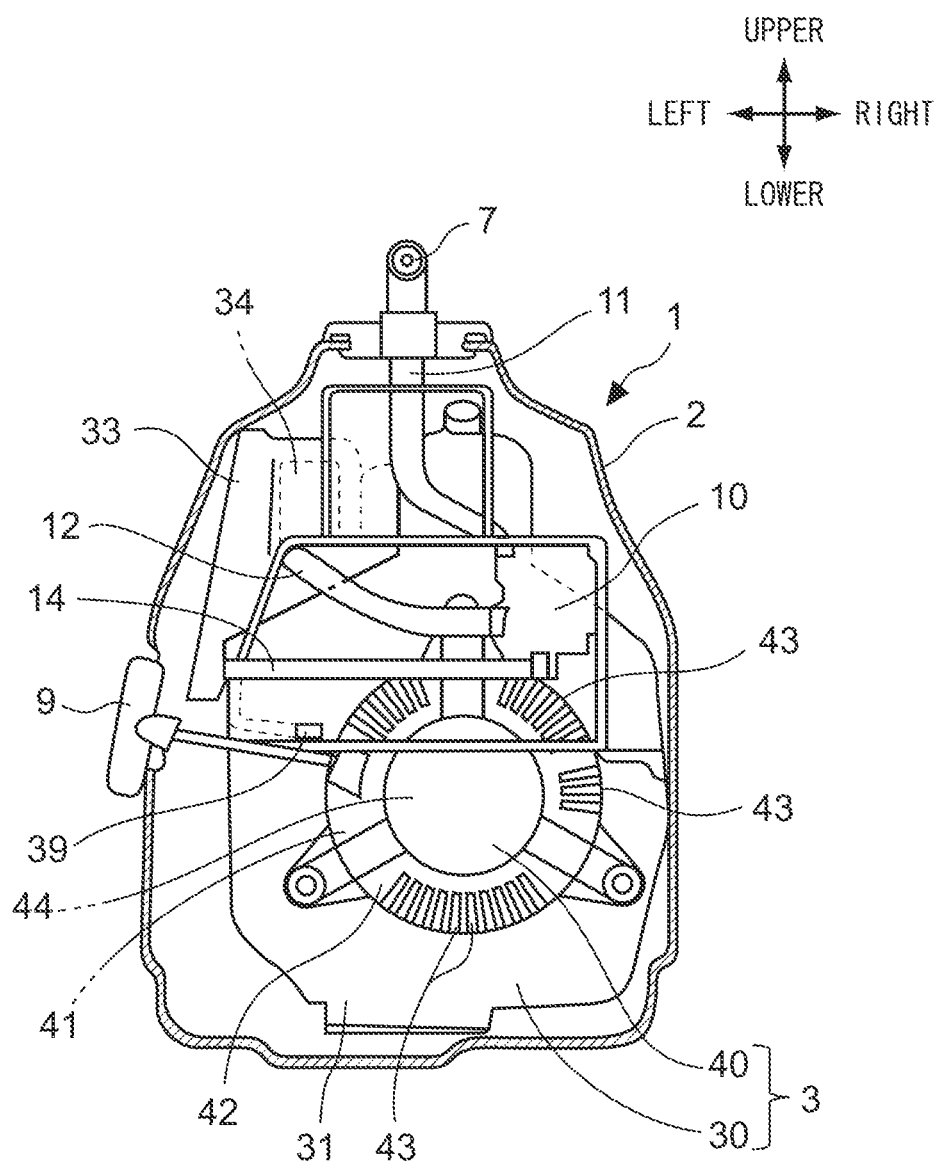
FIG. 3 is an explanatory front view illustrating of the arrangement structure of each part article which constitutes the portable engine generator.

As illustrated in FIGS. 2 and 3, the gas-engine generator body 3 housed inside the outer cover 2 includes an engine 30 operating with gas and a power generation unit 40 disposed at the front side of the engine 30 and generating DC voltage from a rotation of the engine 30. Inside the outer cover 2, there are installed a negative pressure fuel cock 10 as a fuel system and an inverter 20 for converting the DC voltage generated by the power generation unit 40 into AC voltage. The negative pressure fuel cock 10 has a valve structure connected with a tube 11 connected to the gas take-in port 7, a fuel supply tube 12 supplying gas to the engine 30 side, and a negative pressure tube 14 detecting a negative pressure on the engine 30 side. By controlling an opening/closing state of the valve with the negative pressure, gas taken in from the gas take-in port 7 is supplied to the engine 30 through the fuel supply tube 12.

The power generation unit 40 and inverter 20 are connected to each other through a cable 21, and the inverter 20 is connected to an AC unit 23 installed on a rear surface of the operation panel 6 through a cable 22.

Further, in the gas-engine generator body 3, a rotary fan 41 is provided at the front side of the power generation unit 40. The rotary fan 41 is covered by a circular dish-shaped fan cover 42 and disposed so as to face the inverter 20. A plurality of slits (cooling air take-in ports) 43 are formed in a radial direction in a circumferential slope of the fan cover 42. In this configuration, outside air is taken in the outer cover 2 by rotation of the rotary fan 41 through the cooling air take-in louvers 8 and drawn to the gas-engine generator body 3 through the slits (cooling air take-in ports) 43.

A recoil pulley 44 of the recoil starter for starting the engine 30 is housed in the fan cover 42 and is configured to be rotated by pulling the grip 9.

The negative pressure fuel cock 10 is disposed between the slits (cooling air take-in ports) 43 formed in the fan cover 42 covering the rotary fan 41 installed at the front side of the power generation unit 40 and the cooling air take-in louvers 8 formed in the outer cover 2.

Thus, disposition of the negative pressure fuel cock 10 between the slits (cooling air take-in ports) 43 and cooling air take-in louvers 8 allows cooling air to be guided to the negative pressure fuel cock 10 effectively, thereby preventing a temperature of the negative pressure fuel cock 10 from rising due to heat generation of the engine 30, power generation unit 40, or inverter 20.

The engine 30 includes a crank chamber 31 in which a crank shaft (not illustrated) is rotated, a cylinder chamber 32 in which a piston (not illustrated) connected to the crank shaft is reciprocated, an air cleaner 33 installed in an induction system, a mixer 34 mixing supply gas and air, and the like. In this configuration, gas is supplied from the mixer 34 mixing supply gas and air to an upper portion of the cylinder chamber 32 through the fuel supply tube 12 connected to the negative pressure fuel cock 10.

Further, a breather tube 13 is connected to the negative pressure fuel cock 10. The breather tube 13 is provided for transferring gas to the air cleaner 33 of the engine 30 when an excessive amount of gas is supplied from the negative pressure fuel cock 10 to the engine side through the fuel supply tube 12.

Gas combusted in the cylinder chamber 32 is guided from the crank chamber 31 to an elbow 36 through a tube 35, to be exhausted from a muffler chamber 37. A muffler 38 connected to an exhaust tube drawn from the engine 30 is disposed in the muffler chamber 37. An exhaust port of the muffler 38 is disposed so as to face rearward of the outer cover 2.

A rear panel 60 having therein a plurality of cooling air outlets 61 is attached to a rear side of the outer cover 2. Through the cooling air outlets 61, air that has passed inside the outer cover 2 while cooling the gas-engine generator body 3 is exhausted.

A negative pressure take-out port 39 is formed in a side portion of the crank chamber 31. The negative pressure take-out port 39 is provided for taking out as negative pressure in the crank chamber 31. More specifically, the negative pressure tube 14 is connected, at both ends, to the negative pressure take-out port 39 and the negative pressure fuel cock 10. In this configuration, the negative pressure in the crank chamber 31 of the engine 30 is used as an operating negative pressure to open the negative pressure fuel cock 10, thereby allowing gas fuel to be supplied to the engine 30 through the fuel supply tube 12.

The negative pressure fuel cock 10 is disposed so as to be located on a side opposite to the negative pressure take-out port 39 of the crank chamber 31 with respect to a position of the power generation unit 40 when the portable gas-engine generator 1 is turned over and so as to be located at a position higher than the negative pressure take-out port 39 when the portable gas-engine generator 1 is in an upright posture. That is, when the portable gas-engine generator 1 is turned over, lubricant in the crank chamber 31 may leak into the negative pressure tube 14 and then flow into the negative pressure fuel cock 10 to cause malfunction. The above layout structure is adopted for avoiding this problem.

The following describes a case where the portable gas-engine generator 1 is turned over with reference to FIG. 4. FIG. 4 illustrates the portable gas-engine generator 1 when it is in the upright posture or in the turned-over state as viewed from the front side. The portable gas-engine generator 1 at a center of FIG. 4 is in the upright posture as in the portable gas-engine generator 1 of FIG. 3. In this state, an oil level X of the lubricant existing in the crank chamber 31 of the engine 30 is maintained at a height denoted by a dashed line.

A left side of FIG. 4 is the portable gas-engine generator 1 in a state where it is turned over to the left. In this state, the lubricant flows into the negative pressure take-out port 39 and is retained in the negative pressure tube 14 (U-like shaped portion in the drawing) with the oil level X maintained at a height denoted by the dashed line (the retention portion is denoted by shading). In this case, since the negative pressure fuel cock 10 is disposed so as to be located on the side opposite to the negative pressure take-out port 39 of the crank chamber 31 with respect to the position of the power generation unit 40 when the portable gas-engine generator 1 is turned over, the negative pressure fuel cock 10 is positioned above the negative pressure take-out port 39, thereby preventing the lubricant from flowing into the negative pressure fuel cock 10.

Further, the negative pressure fuel cock 10 is disposed so as to be located at a position higher than the negative pressure take-out port 39 when the portable gas-engine generator 1 is in the upright posture, so that when the portable gas-engine generator 1 is returned to the upright state from the above turned-over state, the lubricant that has leaked into the negative pressure tube 14 does not flow to the negative pressure fuel cock 10 but can be brought back to the crank chamber 31.

A right side of FIG. 4 is the portable gas-engine generator 1 in a state where it is turned over from the center to the right. In this case, since the negative pressure fuel cock 10 is disposed so as to be located on the side opposite to the negative pressure take-out port 39 of the crank chamber 31 with respect to the position of the power generation unit 40 when the portable gas-engine generator 1 is turned over, the negative pressure take-out port 39 is positioned above the oil level X of the lubricant, thereby preventing the lubricant from flowing into (leaking into) the negative pressure take-out port 39.

According to the above-described portable gas-engine generator 1, by devising arrangement of the negative pressure fuel cock 10 serving as a fuel system of the engine 30, it is possible to prevent disadvantageous flowing of the lubricant from occurring at the time of turnover without providing a separate breather chamber.

Further, an increase in cooling performance of the negative pressure fuel cock 10 allows the negative pressure fuel cock 10 to be used within a use temperature range, thereby ensuring reliability.

REFERENCE SIGNS LIST

1 . . . portable gas-engine generator
2 . . . outer cover
3 . . . gas-engine generator body
4 . . . output terminal
5 . . . operation unit
6 . . . operation panel
7 . . . gas take-in port
8 . . . cooling air take-in louver
9 . . . pull-out grip
10 . . . negative pressure fuel cock
12 . . . fuel supply tube
14 . . . negative pressure tube
20 . . . inverter
30 . . . engine
31 . . . crank chamber
32 . . . cylinder chamber
39 . . . negative pressure take-out port
40 . . . power generation unit
41 . . . rotary fan
42 . . . fan cover (cover)
43 . . . slit (cooling air take-in port)
44 . . . recoil pulley

The invention claimed is:

1. A portable engine generator comprising:
a power generation unit operating an engine to generate electricity, the power generation unit disposed at a front side of the engine in a longitudinal direction;
a negative pressure fuel cock using a negative pressure in a crank chamber as an operating negative pressure to supply fuel to the engine, the negative pressure fuel cock disposed above and at a front side of slits formed in a fan cover in a vertical direction, the fan cover covering a rotary fan installed at a front side of the power generation unit in the longitudinal direction;
an inverter disposed at a position that is vertically lower than and directly below the negative pressure fuel cock in the vertical direction, the inverter disposed at a front side of the slits formed in the fan cover covering the rotary fan installed at the front side of the power generation unit in the longitudinal direction; and
a cylinder chamber of the engine is positioned in an upright posture on an upper portion of the crank chamber,
wherein the negative pressure fuel cock is disposed in a position close to cooling air take-in ports of the engine, so as to be located on a side opposite to a negative pressure take-out port of the crank chamber with respect to a position of the power generation unit when the portable engine generator is turned over, and so as to be located at a position higher than the negative pressure take-out port when the portable engine generator is in an upright posture, the negative pressure take-out port being disposed at an upper side of the crank chamber of the engine, wherein the upper side of the crank chamber is in an upper half of the crank chamber in the vertical direction, and
wherein the engine is a gas engine operated using gas that is supplied externally through a gas take-in port as fuel, the gas take-in port being disposed at a position that is vertically higher than the negative pressure fuel cock in the vertical direction, wherein the front side of portable engine generator is a side from which the gas take-in port protrudes in the longitudinal direction.

2. The portable engine generator according to claim 1, wherein the cooling air take-in ports of the engine are formed in the fan cover covering a recoil pulley for starting the engine.

* * * * *